United States Patent
Gupta et al.

(10) Patent No.: US 11,409,884 B2
(45) Date of Patent: Aug. 9, 2022

(54) SECURITY PROFILING OF SYSTEM FIRMWARE AND APPLICATIONS FROM AN OOB APPLIANCE AT A DIFFERENTIATED TRUST BOUNDARY

(71) Applicant: Dell Products L.P., Round Rock, TX (US)

(72) Inventors: Chitrak Gupta, Bangalore (IN); Rama Rao Bisa, Bangalore (IN); Elie A. Jreij, Pflugerville, TX (US); Sushma Basavarajaiah, Karnataka (IN); Kala Sampathkumar, Bangalore (IN); Mainak Roy, Kolkata (IN)

(73) Assignee: Dell Products L.P., Round Rock, TX (US)

( * ) Notice: Subject to any disclaimer, the term of this patent is extended or adjusted under 35 U.S.C. 154(b) by 463 days.

(21) Appl. No.: 16/176,096

(22) Filed: Oct. 31, 2018

(65) Prior Publication Data

US 2020/0134192 A1    Apr. 30, 2020

(51) Int. Cl.
G06F 21/57    (2013.01)
G06F 21/56    (2013.01)
G06F 8/65     (2018.01)

(52) U.S. Cl.
CPC .............. *G06F 21/577* (2013.01); *G06F 8/65* (2013.01); *G06F 21/564* (2013.01); *G06F 2221/033* (2013.01)

(58) Field of Classification Search
CPC ........ G06F 21/577; G06F 21/564; G06F 8/65; G06F 2221/033; G06F 21/572
See application file for complete search history.

(56) References Cited

U.S. PATENT DOCUMENTS

| | | | | |
|---|---|---|---|---|
| 8,234,709 B2 * | 7/2012 | Viljoen | ................... | G06F 21/56 726/24 |
| 10,133,867 B1 * | 11/2018 | Brandwine | ........... | G06F 21/567 |
| 2004/0083366 A1 * | 4/2004 | Nachenberg | ............ | G06F 21/51 713/170 |
| 2006/0005046 A1 * | 1/2006 | Hars | ..................... | G06F 21/572 713/191 |

(Continued)

OTHER PUBLICATIONS gartner.com, Bitdefender, Datacenter Revolution and Security, Safeguarding the Software-Defined Datacenter, printed Jul. 26, 2018, https://www.gartner.com/technology/media-products/newsletters/bitdefender/1-3WUGU7D/client2.html.

(Continued)

*Primary Examiner* — Robert B Leung
*Assistant Examiner* — Bruce S Ashley
(74) *Attorney, Agent, or Firm* — Terrile, Cannatti & Chambers; Stephen A. Terrile (57) ABSTRACT

A system, method, and computer-readable medium for a security vulnerability detection operation. The security vulnerability operation includes configuring a firmware security profiling environment with a trusted host and a trusted service processor; receiving a firmware update file via the trusted service processor; using the trusted service processor to identify a security vulnerability within the firmware update file; and, installing the firmware update file to the information handling system only when no security vulnerability is identified by the trusted service processor, the installing being performed by the trusted host.

20 Claims, 8 Drawing Sheets

(56) References Cited

U.S. PATENT DOCUMENTS

| | | | |
|---|---|---|---|
| 2007/0277241 A1* | 11/2007 | Repasi | G06F 21/57 726/24 |
| 2011/0167275 A1* | 7/2011 | Niemela | G06F 21/565 713/188 |
| 2015/0248283 A1* | 9/2015 | Gschwind | G06F 9/4416 717/172 |
| 2016/0267267 A1* | 9/2016 | Hu | H04W 12/128 |
| 2017/0177873 A1* | 6/2017 | Raghuram | G06F 21/575 |
| 2018/0365422 A1* | 12/2018 | Callaghan | H04L 63/0442 |

OTHER PUBLICATIONS

Hewlett Packard, Server Infrastructure Security Solutions, Defend against infrastructure attacks, printed Jul. 26, 2018, https://www.hpe.com/us/en/solutions/infrastructure-security.html#portfolio.

Andrey Ladikov, securelist.com, Why You Shouldn't Completely Trust Files Signed with Digital Certificates, Jan. 29, 2015, https://securelist.com/why-you-shouldnt-completely-trust-files-signed-with-digitalcertificates/68593/.

* cited by examiner

SECURITY PROFILING OF SYSTEM FIRMWARE AND APPLICATIONS FROM AN OOB APPLIANCE AT A DIFFERENTIATED TRUST BOUNDARY

BACKGROUND OF THE INVENTION

Field of the Invention

The present invention relates to information handling systems. More specifically, embodiments of the invention relate to detecting a security vulnerability in a firmware update for an embedded device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for detecting a security vulnerability in a firmware update for an embedded device.

More specifically, in one embodiment the invention relates to a method for performing a security vulnerability detection operation, comprising: configuring a firmware security profiling environment with a trusted host and a trusted service processor; receiving a firmware update file via the trusted service processor; using the trusted service processor to identify a security vulnerability within the firmware update file; and, installing the firmware update file to the information handling system only when no security vulnerability is identified by the trusted service processor, the installing being performed by the trusted host.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: configuring a firmware security profiling environment with a trusted host and a trusted service processor; receiving a firmware update file via the trusted service processor; using the trusted service processor to identify a security vulnerability within the firmware update file; and, installing the firmware update file to the information handling system only when no security vulnerability is identified by the trusted service processor, the installing being performed by the trusted host.

In another embodiment the invention relates to a computer-readable storage medium embodying computer program code, the computer program code comprising computer executable instructions configured for: configuring a firmware security profiling environment with a trusted host and a trusted service processor; receiving a firmware update file via the trusted service processor; using the trusted service processor to identify a security vulnerability within the firmware update file; and, installing the firmware update file to the information handling system only when no security vulnerability is identified by the trusted service processor, the installing being performed by the trusted host.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium for detecting a security vulnerability in a firmware update for an embedded device. Certain aspects of the invention include an appreciation that information security, in general, has become increasingly important in recent years. Certain aspects of the invention likewise include an appreciation that security breaches of all kinds are not only becoming more technologically imaginative as time goes on, but more frequent as well. Those of skill in the art will be aware of various scanning approaches to detect viruses and other malware to protect the integrity of an operating system (OS). However, those same skilled practitioners of the art will also be aware that such approaches typically fail to protect embedded systems and their associated firmware.

As an example, it is not uncommon for a system to receive a firmware update package for a particular embedded system's firmware. It is also not uncommon for such firmware update packages to not be checked, or scanned, for viruses, Trojans or other malware they may contain. Likewise, it is also common for such firmware update packages to have an associated digital signature attesting to its validity and integrity. However, it is likewise possible that such signatures may be substituted, or counterfeited, to deceptively attest to the validity of the contents of their associated file(s).

More particularly, software providers typically compile files on a centralized build server. Once compilation is complete, the resulting files are then automatically signed to verify their authenticity. Consequently, if a cybercriminal gains access to the software company's network, they can use the build server to compile a malicious file and then include it in a group of files such that it automatically gets signed with the company's digital signature. The result of such an attack is the cybercriminal can obtain a malicious file signed with a valid digital certificate. In practice, this type of attack is fairly rare as most software producers have adequate security in place to protect their build servers. Nonetheless, there are known cases of such attacks being successfully conducted, with the result of malicious files being signed with a trusted company's certificate.

Certain aspects of the invention likewise include an appreciation that a cybercriminal may succeed in penetrating a software provider's network and gain access to a private key used to sign files. With that key, they can then sign a malicious file and pass it off as being legitimate. Likewise, certain aspects of the invention include an appreciation that once a cybercriminal steals such a key, they may also sell it to someone else to use, further exacerbating the opportunity for security vulnerabilities. However, larger software organizations typically keep their private keys in dedicated, well-protected hardware modules, which make them more difficult to steal. As a result, private keys are typically stolen from smaller companies or private software manufacturers who do not pay enough attention to security. Nonetheless, theft of such private keys creates security vulnerabilities, regardless of whom they may be stolen from.

Certain aspects of the invention include an appreciation that while a recipient of a digitally-signed firmware update package, or other file(s), may check its digital signature to prove the authenticity of its provider, it is not uncommon to store the file(s) without its signature. Consequently, the signature is not available to verify the authenticity of the file(s) at a later time. Accordingly, such a practice may create yet other security vulnerabilities, as the original files may be maliciously replaced with another set of files, possibly containing malware of various kinds, whose authenticity cannot be verified.

Certain aspects of the invention may likewise reflect an appreciation that certain hardware components, such as a Peripheral Component Interconnect Express (PCIe) card, may include firmware that is infected with malware. Furthermore, it is uncommon to check the firmware of such components for malware prior to their use. As a result, connecting the component to the system, such as by plugging a PCIe card into a system bus, may result in infecting the system. Likewise, certain aspects of the invention include an appreciation that a flash memory device, such as a Universal Serial Bus (USB) drive, is likewise rarely scanned for any malware it may contain. Consequently, such flash memory devices may infect any system that accesses them.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
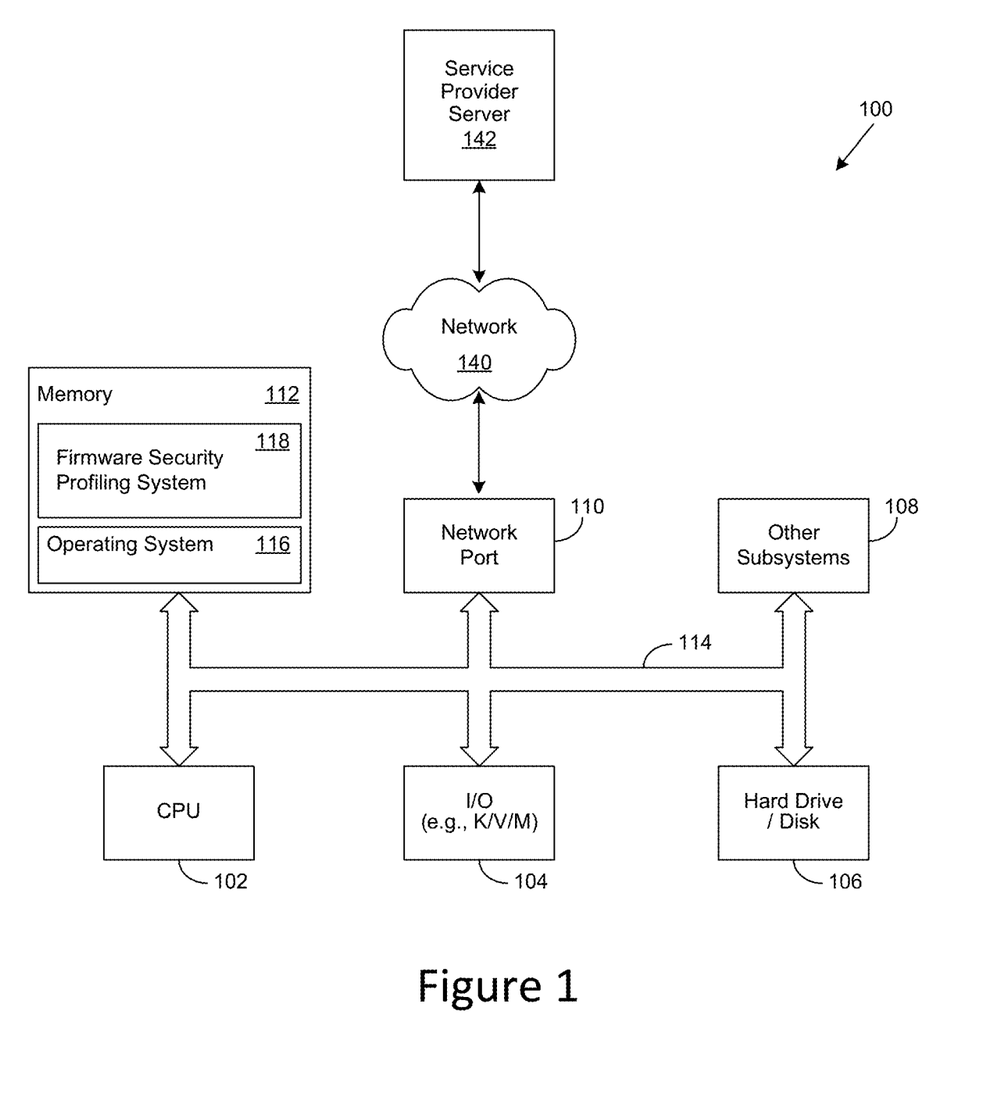
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a firmware security profiling system 118. In one embodiment, the information handling system 100 is able to download the firmware security profiling system 118 from the service provider server 142. In another embodiment, the firmware security profiling system 118 is provided as a service from the service provider server 142.

The firmware security profiling system 118 performs a firmware security profiling operation. The firmware security profiling operation improves processor efficiency, and thus the efficiency of the information handling system 100, facilitating the firmware security profiling operation. In certain embodiments, the firmware security profiling operation can improve the identification of security vulnerabilities during operation of an information handling system 100. As will be appreciated, once the information handling system 100 is configured to perform the firmware security profiling operation, the information handling system 100 becomes a specialized computing device specifically configured to perform the firmware security profiling operation and is not a general purpose computing device. Moreover, the implementation of the firmware security profiling operation on the information handling system 100 improves the functionality of the information handling system 100 and provides a useful and concrete result of improving the identification of malware and other security vulnerabilities when performing firmware security profiling operations. In certain embodiments, the firmware security profiling operation can improve the identification of security vulnerabilities that may be associated with a firmware update.

Figure 2:
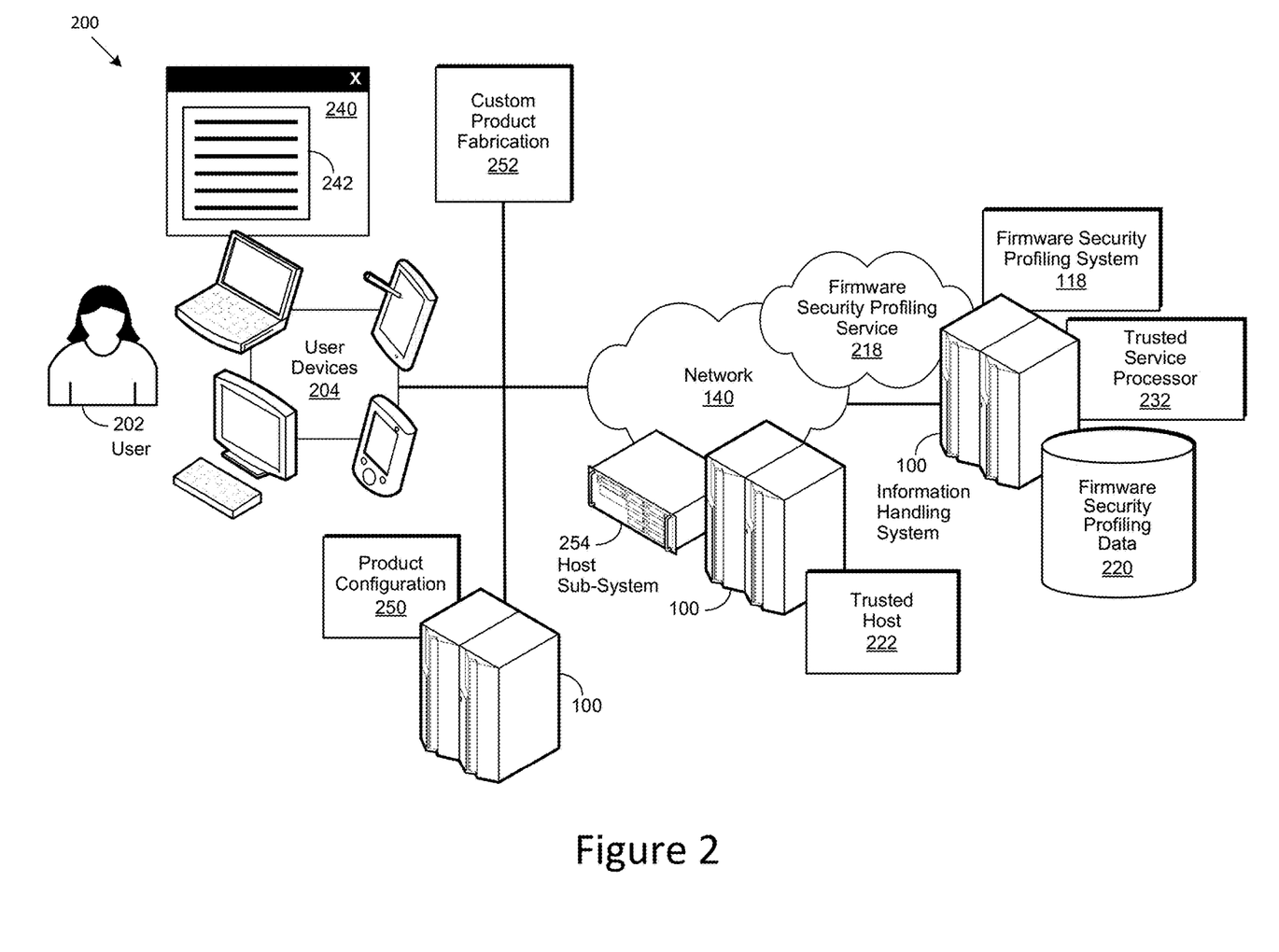
FIG. 2 shows a block diagram of a firmware security profiling environment.

FIG. 2 is a block diagram of a firmware security profiling environment 200 implemented in accordance with an embodiment of the invention. In certain embodiments, the firmware security profiling environment 200 may include a firmware security profiling system 118. In certain embodiments, the firmware security profiling environment 200 may include a repository of firmware security profiling data 220. In certain embodiments, the repository of firmware security profiling data 220 may be local to the system executing the firmware security profiling system 118 or may be executed remotely.

In certain embodiments, the firmware security profiling system 118 may be implemented to perform various firmware security profiling operations to detect security vulnerabilities associated with host sub-system's 254 firmware. In certain embodiments, firmware security profiling operations may be performed to scan the host sub-system's 254 firmware, a firmware update package, various other files, such as digital signatures, or a combination thereof, to detect the presence of a security vulnerability. In certain embodiments, the security vulnerability may include the presence of malware or other malicious code. In certain embodiments, the security vulnerability may include a code deficiency.

In certain embodiments, a user 202 may use a user device 204 to interact with the firmware security profiling system 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a firmware security profiling system user interface (UI) 240. In certain embodiments, the firmware security profiling system UI 240 may be implemented to present a graphical representation 242 of firmware security profiling information, which is automatically generated in response to interaction with the firmware security profiling system 118.

In certain embodiments, the user device 204 is used to exchange information between the user 202 and the firmware security profiling system 118, a product configuration system 250, and a custom product fabrication system 252, through the use of a network 140. In certain embodiments, the network 140 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the firmware security profiling system UI 240 may be presented via a website. In certain embodiments, the website may be provided by one or more of the firmware security profiling system 118 and the product configuration system 250. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the firmware security profiling system 118 may be implemented to interact with the product configuration system 250, which in turn may be executing on a separate information handling system 100. In various embodiments, the product configuration system 250 interacts with a custom product fabrication system 252. In various embodiments, the custom product fabrication system 252 fabricates products, which may result in detecting and overcoming firmware security vulnerabilities, which in turn may be associated with the custom product fabrication system 252 and the products it may be used to fabricate.

In certain embodiments, the custom product fabrication system 252 may be used to fabricate, configure, or otherwise prepare a host sub-system 254 for use. In certain embodiments, such fabrication, configuration or preparation may include the installation, or update, of certain firmware associated with the host sub-system 254. In certain embodiments, firmware code may be provided by the trusted host 222, the trusted service processor 232, or both, to the custom product fabrication system 252, where it is then used to install, update, or otherwise prepare firmware associated with the host sub-system 254.

In certain embodiments, the trusted host 222, the trusted service processor 232, or both, may be implemented to install, update, or otherwise prepare firmware associated with the host sub-system 254. In various embodiments, the trusted host 222, the trusted service processor 232, or both, may be implemented to use a network 140 to perform such installation, or update, of certain firmware associated with the host sub-system 254. In certain embodiments, the firmware security profiling system 118 may be implemented in combination with a trusted service processor 232 to perform a firmware security profiling operation, as described in greater detail herein. In certain embodiments, the trusted service processor 232 may be implemented in combination with a trusted host 222, as likewise described in greater detail herein, to perform the firmware security profiling operation. In certain embodiments, the trusted host 222 and the trusted service processor 232 may be implemented on an information handling system 100, individually or in combination.

Figure 3:
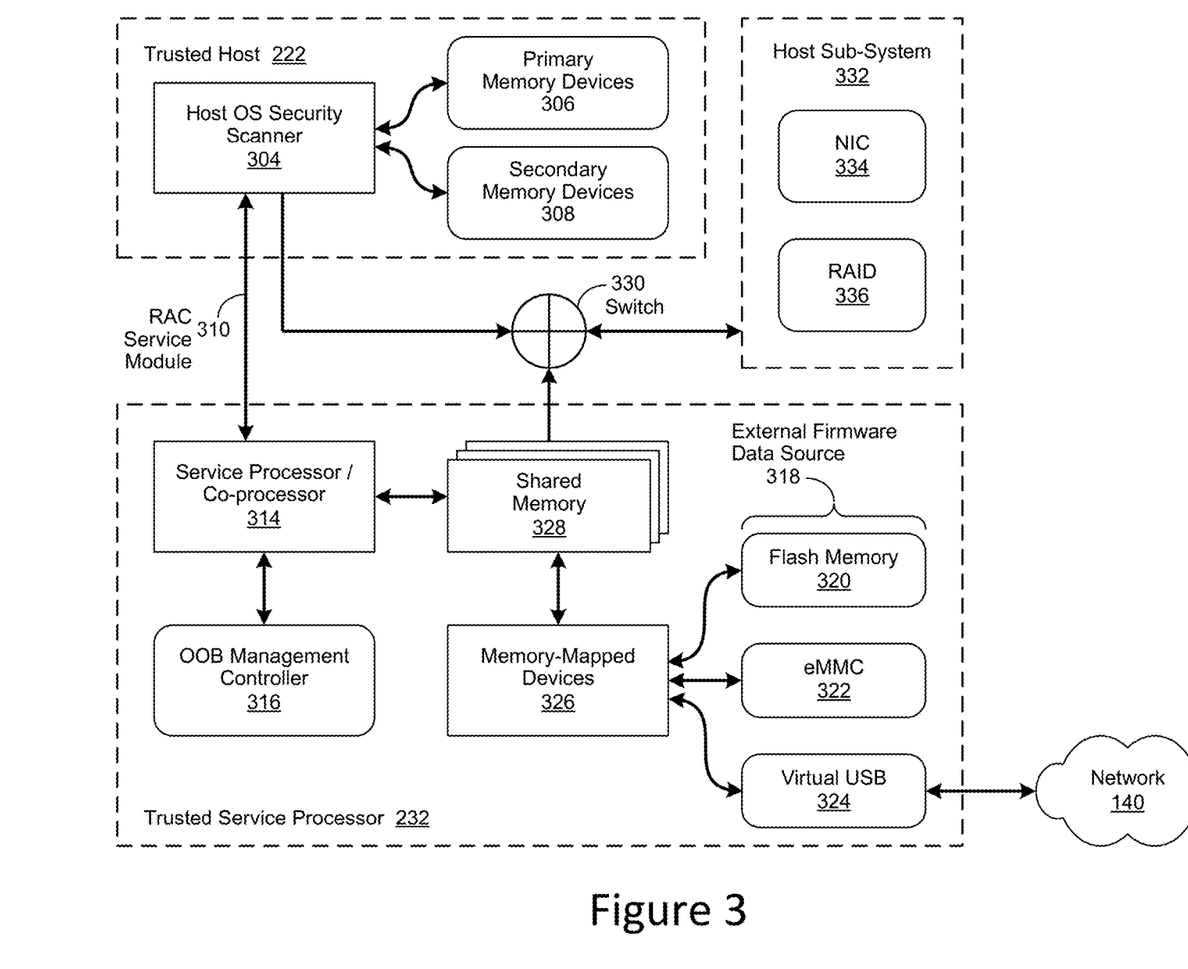
FIG. 3 shows a functional block diagram of a trusted host and a trusted service processor.

FIG. 3 shows a functional block diagram of a trusted host and a trusted service processor implemented in accordance with an embodiment of the invention. As used herein, a trust boundary broadly refers to a boundary delineating where program data, or its execution, changes its level of trust. In certain embodiments, the trust boundary may be implemented to delineate a boundary within which a system trusts all sub-systems and their associated data. In certain embodiments, the associated data may include computer-executable instructions implemented in the form of firmware. Firmware, as likewise used herein, broadly refers to computer software that provides low-level control of a hardware component familiar to those of skill in the art.

As typically implemented, firmware provides a standardized operating environment for a hardware component's more complex software, which allows for more hardware independence. Firmware may also be implemented as an operating system for less complex devices, performing all control, monitoring, and data manipulation functions. Examples of devices containing firmware include embedded systems, computers, computer sub-systems, computer peripherals, mobile devices, such as smart phones, and others. In certain embodiments, firmware may be implemented in non-volatile memory devices such as read-only memory (ROM), erasable programmable ROM (EPROM), or flash memory.

Accordingly, a trusted host 222, as used herein, broadly refers to a host system that is configured to provide a trust boundary for the data it may provide to its associated sub-systems 332 and the hardware components they contain. In certain embodiments, the data provided by the trusted host 222 to an associated sub-system 332 may include firmware source code, compiled firmware code, firmware update code, or a combination thereof. As likewise used herein, a service processor broadly refers to a management device used to remotely access, monitor and troubleshoot a node. Accordingly, as used herein, a trusted service processor 232 broadly refers to a service processor configured to provide a trust boundary for the data it may provide to a node. In certain embodiments, the data the trusted service processor 232 may provide to a node may include firmware source code, compiled firmware code, firmware update code, or a combination thereof. In certain embodiments, the node may be an information handling system, such as a server. In certain embodiments the node may be a host sub-system 332.

In certain embodiments, the trusted host 222 may include a host operating system (OS) security scanner 304, primary 306 memory devices, and secondary 308 memory devices. In certain embodiments the host OS security scanner 304 may be implemented as a Broadband Management Controller (BMC), which in certain embodiments may be implemented to manage the interface between system management software and system platform hardware. In certain embodiments, the BMC may be implemented as a specialized microcontroller embedded within a system, such as the motherboard of a server.

In certain embodiments, the BMC may be implemented to provide intelligence in an Intelligent Platform Management Interface (IPMI) architecture. As used herein, an IPMI architecture broadly refers to a set of computer interface specifications for an autonomous computer subsystem to provide management and monitoring capabilities independent of a host system's CPU, firmware, and OS. In certain embodiments an IPMI architecture may be implemented to define a set of interfaces for out-of-band (OOB) management of a system and monitoring of its operation. As used herein, OOB broadly refers to the use of a dedicated channel in the performance of such management and monitoring.

In certain embodiments the host OS security scanner 304 may be implemented to scan the primary 306 and secondary 308 memory devices for security vulnerabilities. In certain embodiments, the primary 306 memory devices may include system memory, read-only memory (ROM), random access memory (RAM), and other memory directly accessible by a system's Central Processing Unit (CPU). In certain embodiments, the secondary 308 memory devices may include external memory devices, such as hard disk drives, removable memory devices, such as tape cartridges and optical disks, network-attached storage, flash memory devices, and other data storage devices familiar to skilled practitioners of the art.

As an example, a particular primary 306 or secondary 308 memory device may be implemented to store firmware source code, compiled firmware code, firmware update code, or a combination thereof. To continue the example, the firmware source code may be compiled into compiled firmware code and subsequently provided as a firmware update package. As used herein, a firmware update package broadly refers to one or more data files used to update, patch, or otherwise modify, firmware installed on a hardware component of a host system or an associated sub-system 332. In certain embodiments, the firmware code, whether in its source or compiled form, may be digitally signed with a private key to generate an associated digital signature. In certain embodiments, the resulting digital signature may be used to attest to the authenticity and integrity of its associated firmware code.

In certain embodiments, the host OS security scanner 304 may be implemented to provide certain digital signatures and one or more malware scanning application files to the trusted service processor 232. In certain embodiments, the malware scanning application files are provided to the trusted service processor 232 via a Broadband Management Controller (BMC) network pass-through familiar to those of skill in the art. In certain embodiments, the malware scanning files may be compiled such that it is configured to be executable by the OS used by the trusted service processor 232. In certain embodiments, the digital signatures may be retrieved from a trusted source by the trusted host 222 prior to being provided by the host OS security scanner 304 to the trusted service provider 232.

In certain embodiments, the trusted service processor 232 may include a service processor/co-processor 314. In certain embodiments, the service processor/co-processor 314 may be implemented to receive the digital signatures and malware scanning application files from the trusted host 222. In certain embodiments, the service processor/co-processor 314 may be implemented to use the signatures and malware scanning application files to perform various firmware security scanning operations, described in greater detail herein.

In certain embodiments, the service processor/co-processor 314 may be implemented in combination with an out-of-band (OOB) management controller 316 to perform the firmware security scanning operations. In certain embodiments, the OOB management controller 316 may be used to monitor and manage various system resources, such as hardware components associated with a host sub-system 332. In certain embodiments, the OOB management controller 316 may be implemented as a Remote Access Controller (RAC), one example of which is an iDRAC®, produced by Dell, Inc., headquartered in Round Rock, Tex.

In certain embodiments, the digital signatures, malware scanning application files, file security vulnerability signatures, malware signature updates, or a combination thereof, may be provided to the trusted service processor 232 via a Remote Access Controller (RAC) service module. One example of a RAC service module is the iDRAC® Service Module (ISM), produced by Dell, Inc., headquartered in Round Rock, Tex. In certain embodiments, the RAC service module may be implemented as an OS-resident process executing within the trusted host 222. In certain embodiments, the OS-resident process may be implemented to support various RAC management capabilities for one or more host operating systems.

In certain embodiments, the trusted service processor 232 may be implemented to receive firmware source code, compiled firmware code, firmware update code, or a combination thereof, from an external firmware data source 318. In certain embodiments, the external firmware data source 318 may be in the form of a flash memory device 320 familiar to skilled practitioners of the art. In certain embodiments, the flash memory device 320 may be implemented to provide a system image, a boot disk, system back-up data, or general data storage. In certain embodiments, the flash memory device 320 may contain one or more partitions, each of which may be implemented for a particular purpose, such as storing a firmware update package and its associated digital signature. One example of such a flash memory device 320 is vFlash, produced by Dell, Inc., headquartered in Round Rock, Tex., which in certain embodiments may be implemented to back up system configurations such that they can be restored at a later date.

In certain embodiments, the external firmware data source 318 may be in the form of an Embedded MultiMedia Card (eMMC) 322. In typical implementations, an eMMC 322 is a physical package of flash memory and an associated controller integrated on the same silicon die. In certain embodiments, the eMMC 322 may be implemented to include a MultiMedia Card (MMC) interface, flash memory, and a flash memory controller.

In certain embodiments, the external firmware data source 318 may be in the form of a virtual Universal Serial Bus (USB) drive 324. As used herein, a virtual USB drive 324 broadly refers to a mass storage device configured to appear as an external drive communicating data over a USB port. Consequently, such virtual USB drives 324 may pose a security risk if they are not scanned for security vulnerabilities. In certain embodiments, the mass storage device may be a component of an information handling system. As an example, a smart phone may be configured such that its internal storage will appear as an external firmware data source 318 to the trusted service processor 232. In this example, firmware source data, compiled firmware data, firmware update data, associated digital signatures, or some combination thereof stored in the smart phone's internal storage can be communicated to the trusted service processor 232 over their respective USB ports.

In certain embodiments, the data stored in the virtual USB drive 324 may be received from a remote source over a network 140.

In certain embodiments, mapping operations familiar to those of skill in the art may be performed to map the external firmware data sources 318 to the host address bus of the trusted service processor 22 such that they can be individually accessed as memory-mapped devices 326. In certain embodiments, such memory-mapped devices may be implemented such that it is accessible by Central Processor Unit (CPU) of the trusted service processor 232 as if it were a Random Access Memory (RAM) device. In certain embodiments, the data associated with the memory-mapped devices 326 may be loaded in certain embodiments into shared memory 328. In certain embodiments, the service processor/co-processor 314 may be implemented to use the digital signatures and the malware scanning application files provided by the trusted host 222 to perform firmware security profiling operations on the shared memory 328 to detect various security vulnerabilities.

In certain embodiments, the firmware security profiling operations may include scanning the shared memory 328 for malware, such as viruses and Trojans, corresponding to individual mapped-memory devices 326. In various embodiments, the firmware security profiling operations may include comparing certain digital signatures received from the trusted host 222 to a digital signature associated with firmware data provided by a particular external firmware data source 332. In these embodiments, a security vulnerability may be detected if the two digital signatures fail to match one another.

In certain embodiments, the trusted host 222, the trusted service processor 232, or a combination of the two, may be implemented to install, update, or otherwise modify firmware associated with a host sub-system 332. In certain embodiments, the firmware may be embedded in a physical module of the host sub-system 332, such as a NIC 334 or RAID 336. In certain embodiments, a switch 328, such as a Peripheral Component Interconnect Express (PCIe) switch 328, may be used by the trusted host 222, the trusted service processor 232, or the two in combination, to access a particular host sub-system 332.

Figure 4:
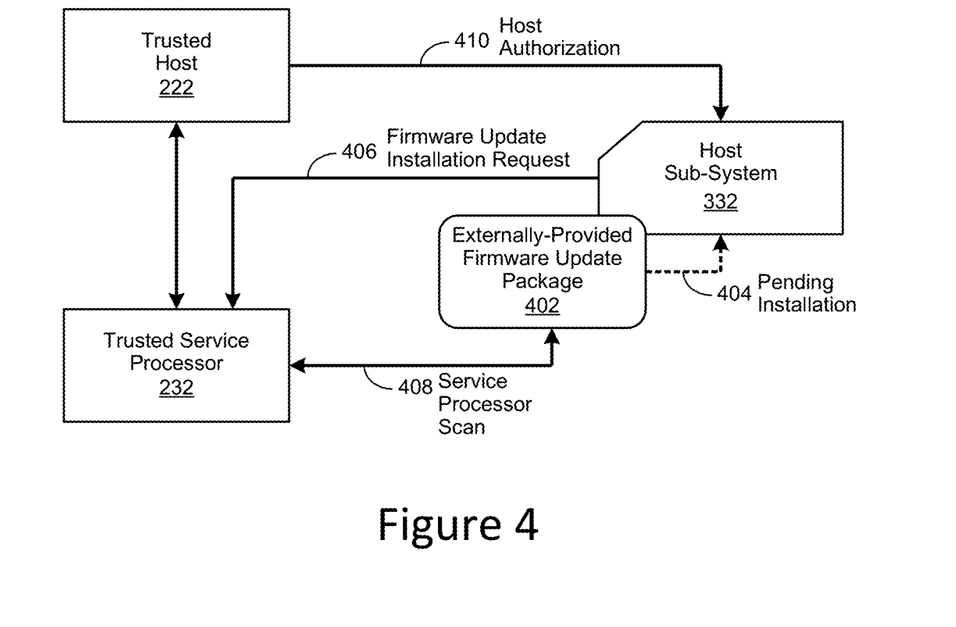
FIG. 4 shows a process flow for authorizing the installation of a firmware update package after being scanned for security vulnerabilities by a service processor.

FIG. 4 shows a process flow implemented in accordance with an embodiment of the invention for authorizing the installation of a firmware update package after being scanned for security vulnerabilities by a service processor. In certain embodiments, a firmware update package 402 provided by an external source may be received by a host sub-system 332 for installation. In certain embodiments, the installation of the externally-provided firmware update package 402 is first placed in a pending 404 state and a firmware update installation request 406 is submitted to a trusted service processor 232, described in greater detail herein.

In response, security profile scanning 408 operations, likewise described in greater detail herein, are performed on the externally-provided firmware update package 402 by the trusted service processor 232 to detect any security vulnerabilities. As likewise described in greater detail herein, the trusted service processor 232 may use certain malware scanning application files and digital signatures provided by a trusted host 222 to perform the security profile scanning 408 operations. Once the security profile scanning 408 operations are completed, the results are provided by the trusted service processor 222 to the trusted host 232. If no security vulnerabilities were detected, then the trusted host 232 authorizes 410 installation of the externally-provided firmware update package 402. Otherwise, installation of the externally-provided firmware update package 402 is blocked.

Figure 5:
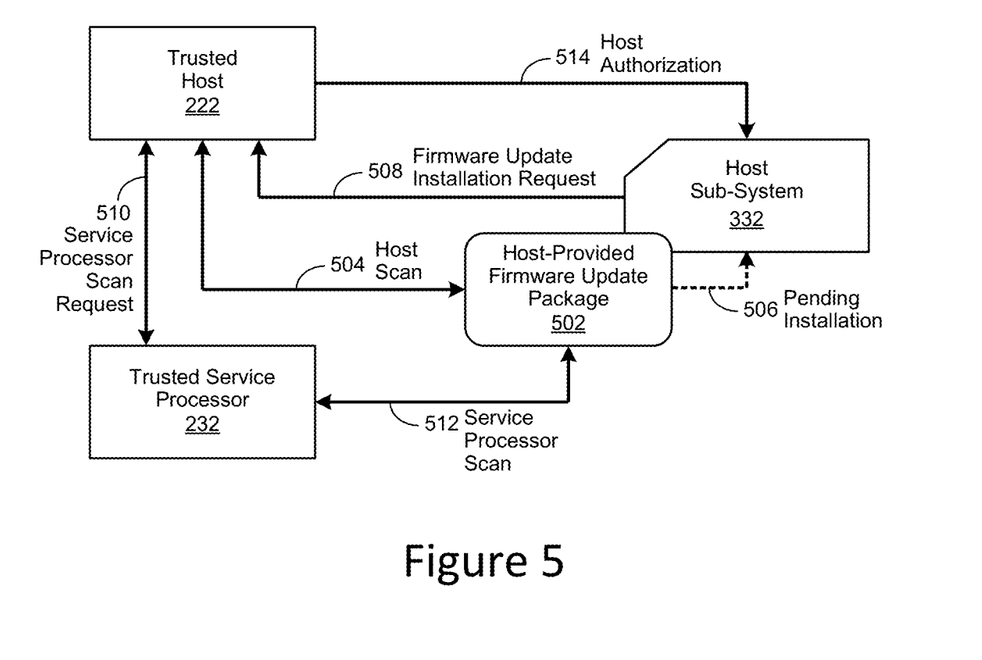
FIG. 5 shows a process flow for authorizing the installation of a firmware update package after being jointly scanned for security vulnerabilities by a host and a service processor.

FIG. 5 shows a process flow implemented in accordance with an embodiment of the invention for authorizing the installation of a firmware update package after being jointly scanned for security vulnerabilities by a host and a service processor. Certain embodiments of the invention reflect an appreciation that a firmware update package 502 may be provided by a trusted host 222 to a host sub-system 332 for installation. Likewise, certain embodiments of the invention reflect an appreciation that the trusted host 222 may be running an operating system (OS) that is different than the OS of the host sub-system 332. Certain embodiments of the invention likewise reflect an appreciation that while a host operating system (OS) security scanner implemented trusted host 222 may have scanned 504 the host-provided firmware update package 502 for its native OS, it may not be able to do so for the OS used by the host sub-system 332.

Accordingly, a firmware update package 502 provided by a host running one OS may be received by a host sub-system 332 running another. In certain embodiments, the installation of the host-provided firmware update package 502 is first placed in a pending 506 state and a firmware update installation request 508 is submitted to a trusted host 222, described in greater detail herein. In response, the trusted host 222 places a scan request 510 to the trusted service processor 232 to use malware scanning application files compatible with the OS running on the host sub-system 332 to scan the host-provided firmware update 502 for security vulnerabilities.

The malware scanning application files that are compatible with the OS running on the host sub-system are then used by the trusted service processor 232 to perform security profile scanning 512 operations, are then performed on the host-provided firmware update package 502 to detect any security vulnerabilities. In certain embodiments, as likewise described in greater detail herein, the OS-scanning files used by the trusted service processor 232 to perform such security profile scanning 512 operations may be provided by the trusted host 222. Once the security profile scanning 512 operations are completed, the results are provided by the trusted service processor 222 to the trusted host 232. If no security vulnerabilities were detected, then the trusted host 232 authorizes 514 installation of the host-provided firmware update package 502. Otherwise, installation of the host-provided firmware update package 502 is blocked.

Figure 6:
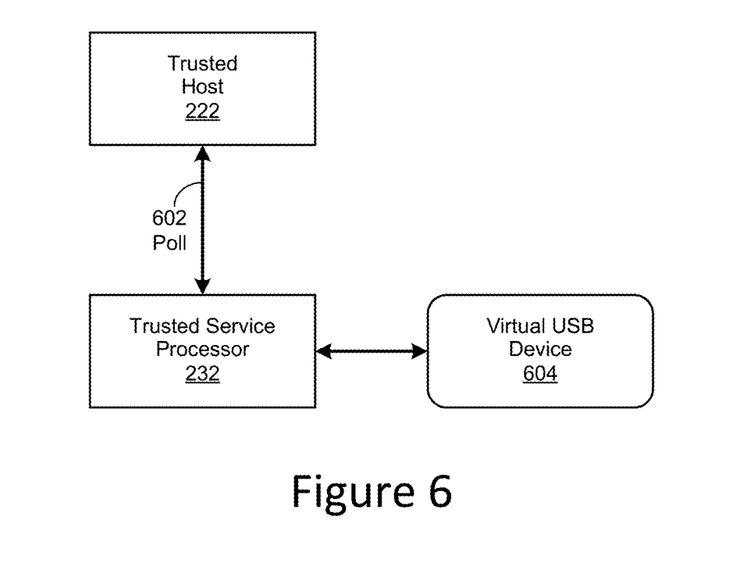
FIG. 6 shows a functional block diagram of the performance of firmware security profiling operations on a virtual Universal Serial Bus (USB) device.

FIG. 6 shows a functional block diagram of the performance of firmware security profiling operations implemented in accordance with an embodiment of the invention on a virtual Universal Serial Bus (USB) memory device. In certain embodiments, firmware source code, compiled firmware code, firmware update code, or a combination thereof, may be provided by an external firmware data source on a virtual USB device 604, described in greater detail herein. In certain embodiments, a trusted service processor 232 may be implemented to perform various firmware security profiling operations, likewise described in greater detail herein, before ingesting the code stored on the virtual USB device 604.

In certain embodiments, the code stored on the virtual USB device 604 may, or may not, be ingested by the trusted service processor 232 if the firmware security profiling operations result in the detection of security vulnerabilities. In these embodiments, the decision whether or not to ingest the code stored on the virtual USB device 604 is a matter of design choice. In certain embodiments, polling operations 602 familiar to those of skill in the art may be performed by a trusted host 222 for the presence of firmware source code, compiled firmware code, firmware update code, or a combination thereof, ingested by the trusted service processor from the virtual USB device. In certain embodiments, firmware source code, compiled firmware code, firmware update code, or a combination thereof, ingested from the virtual USB device 604 may be used by the trusted host 222, the trusted service processor 232, or both to perform various firmware security profiling operations.

Figure 7:
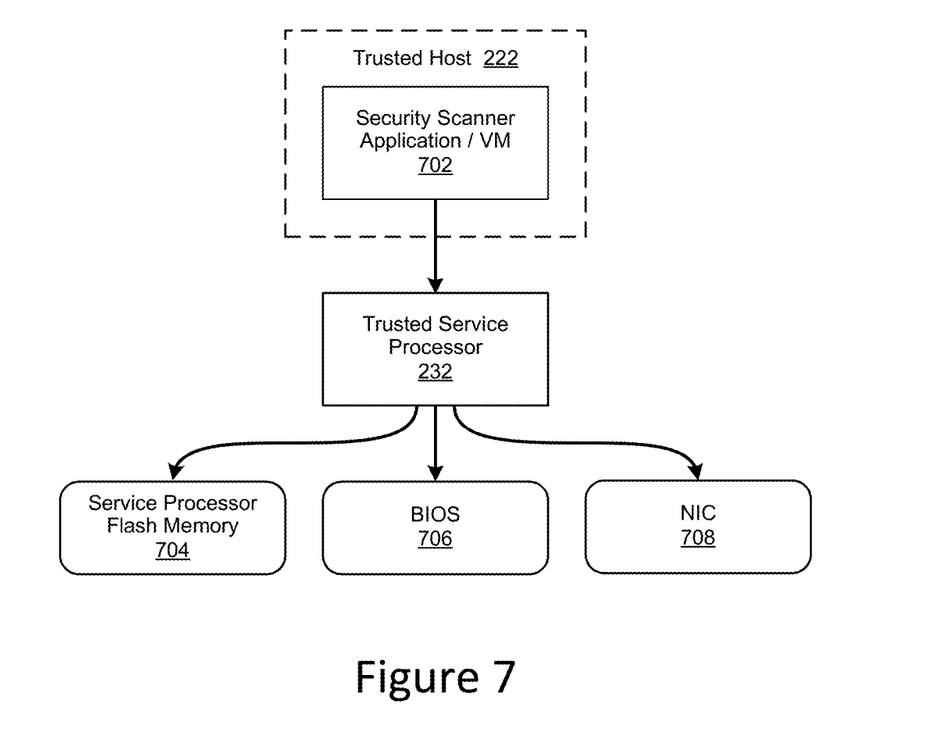
FIG. 7 shows a functional block diagram of the performance of firmware security profiling operations within a trusted host.

FIG. 7 shows a functional block diagram of the performance of firmware security profiling operations implemented in accordance with an embodiment of the invention within a trusted host. In certain embodiments, a security scanner 702 application, described in greater detail herein, may be implemented to run in the operating system (OS) of a trusted host 222. In certain embodiments, the security scanner 702 application may be run in a virtual machine (VM), hosted by the trusted host 222. In these embodiments, the determination of whether to run the security scanner 702 application within the OS of the trusted host 222, or in a VM, is a matter of design choice.

In certain embodiments, the security scanner 702 application may be implemented to perform various firmware security profiling operations, described in greater detail herein. In certain embodiments, the firmware security profiling operations may include scanning various service processor flash memory 704, Basic Input/Output System (BIOS) 706 firmware, Network Interface Controller (NIC) 708 firmware, and so forth, for security vulnerabilities. In certain embodiments, a trusted service processor 232 may be implemented in combination with the trusted host 222 to perform various monitoring and management operations associated with the firmware security profiling operations. In certain embodiments, firmware security profiling operations performed by the security scanner 702 operation may be provided as a firmware security profiling service.

Figure 8A:
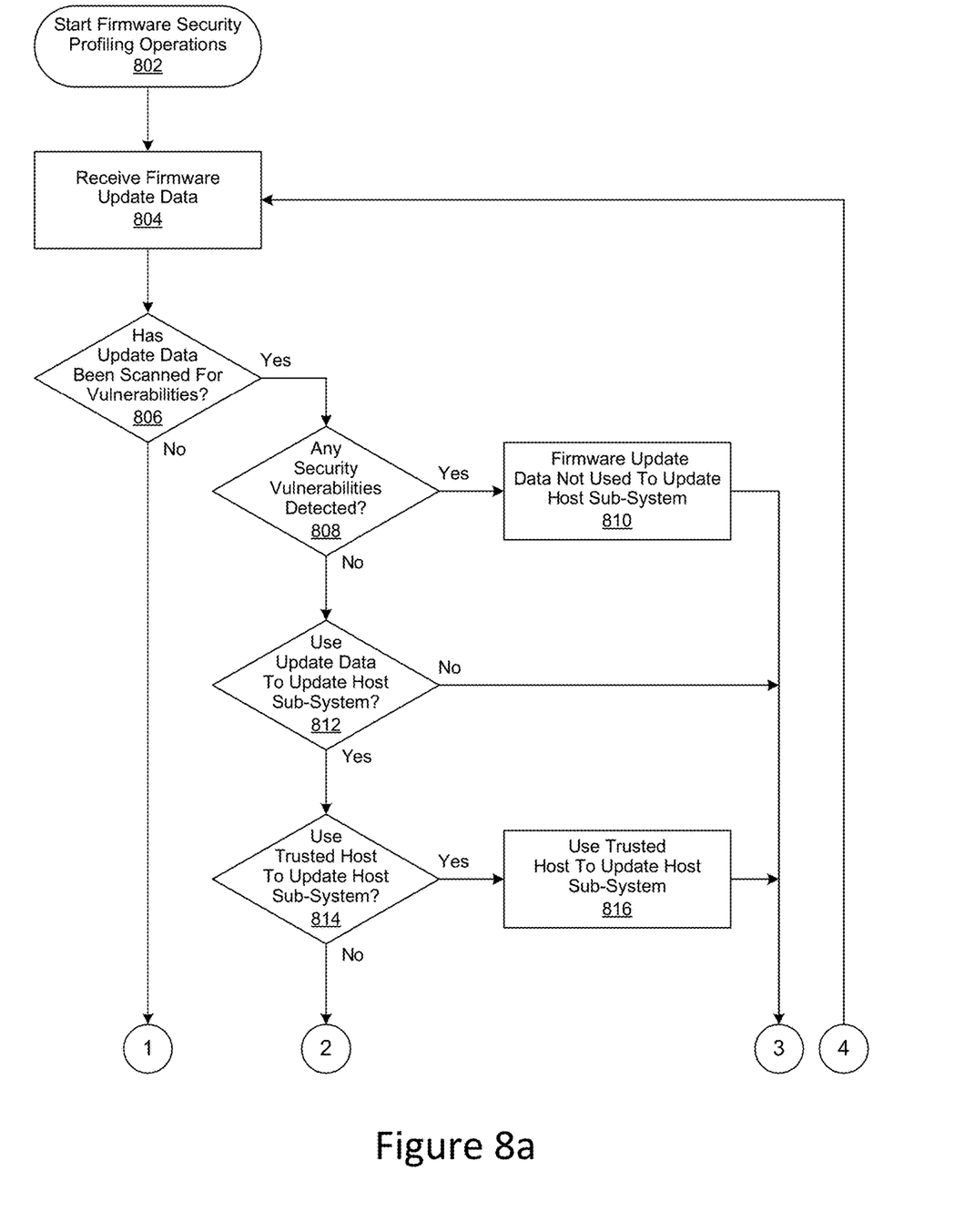
FIGS. 8a and 8b show a flow chart of the performance of firmware security profiling operations.
Figure 8B:
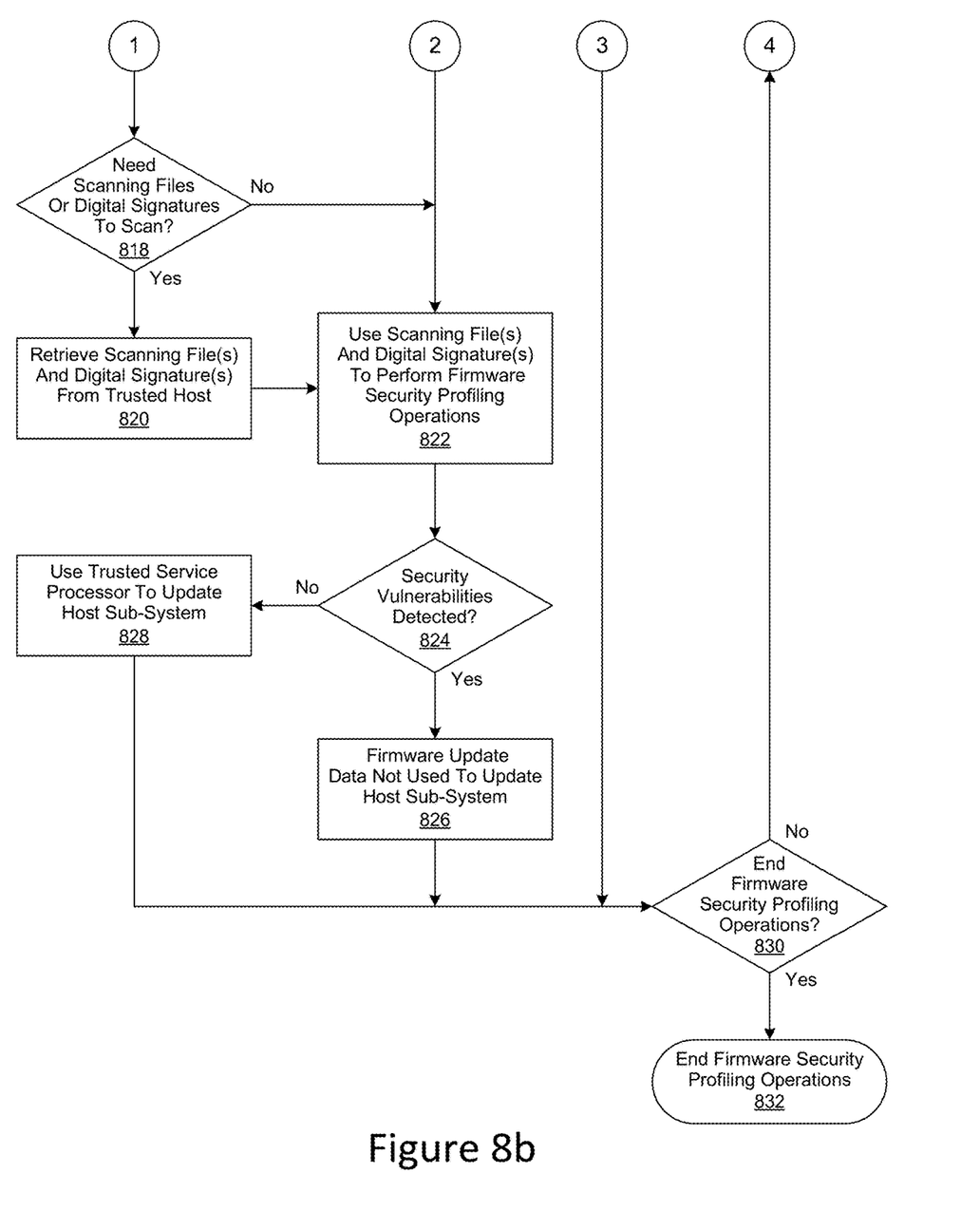

FIGS. 8a and 8b show a flow chart of the performance of firmware security profiling operations implemented in accordance with an embodiment of the invention. In this embodiment, firmware security profiling operations are begun in step 802, followed by firmware update data being received in step 804, as described in greater detail herein. A determination is then made in step 806 whether the update data has been scanned for security vulnerabilities. As an example, a trusted service processor may receive pre-scanned firmware update data from a trusted host.

If it was determined in step 806 that the firmware update data received in step 804 has been scanned for security vulnerabilities, then a determination is made in step 808 whether any security vulnerabilities were detected. As an example, pre-scanned firmware update files received from a trusted host may be re-scanned for security vulnerabilities by a trusted service processor after they are received. If it was determined in step 808 that any security vulnerabilities were detected, then the firmware updated data is not used to update a host sub-system's firmware in step 810.

However, if it was determined in step 808 that no security vulnerabilities were detected, then a determination is made in step 812 whether to use the firmware update data to update a host sub-systems firmware. If so, then a determination is made in step 814 whether to use a trusted host, as described in greater detail herein, to update a host sub-system's firmware. If so, then firmware update data is used in step 816 by the trusted host to update the host sub-system's firmware.

However, if it was determined in step 806 that the firmware update data received in step 804 has not been scanned for security vulnerabilities, then a determination is made in step 818 whether any malware scanning application files or digital signatures are needed to perform security profiling operations to detect security vulnerabilities. If so, then they are retrieved from a trusted host, or other trusted source, in step 820. Thereafter, or if it was determined in step 814 to not use a trusted host to update the host sub-system's firmware, then malware scanning application files and digital signatures are used, as described in greater detail herein, to perform firmware security profiling operations on the firmware update data in step 822.

A determination is then made in step 824 whether any security vulnerabilities are detected in the firmware update data. If so, then the firmware update data is not used in step 826 to update the host sub-system's firmware. If not, then the firmware update data is used by the trusted service processor in step 628 to update the host sub-system's firmware. Thereafter, or once the operations associated with steps 810, or 816, or 826 are completed, or if it was determined in step 820 to not use the firmware update data, then a determination is made in step 830 whether to end firmware security profiling operations. If not, then the process is continued, proceeding with step 804. Otherwise, firmware security profiling operations are ended with step 832.

Figure 9:
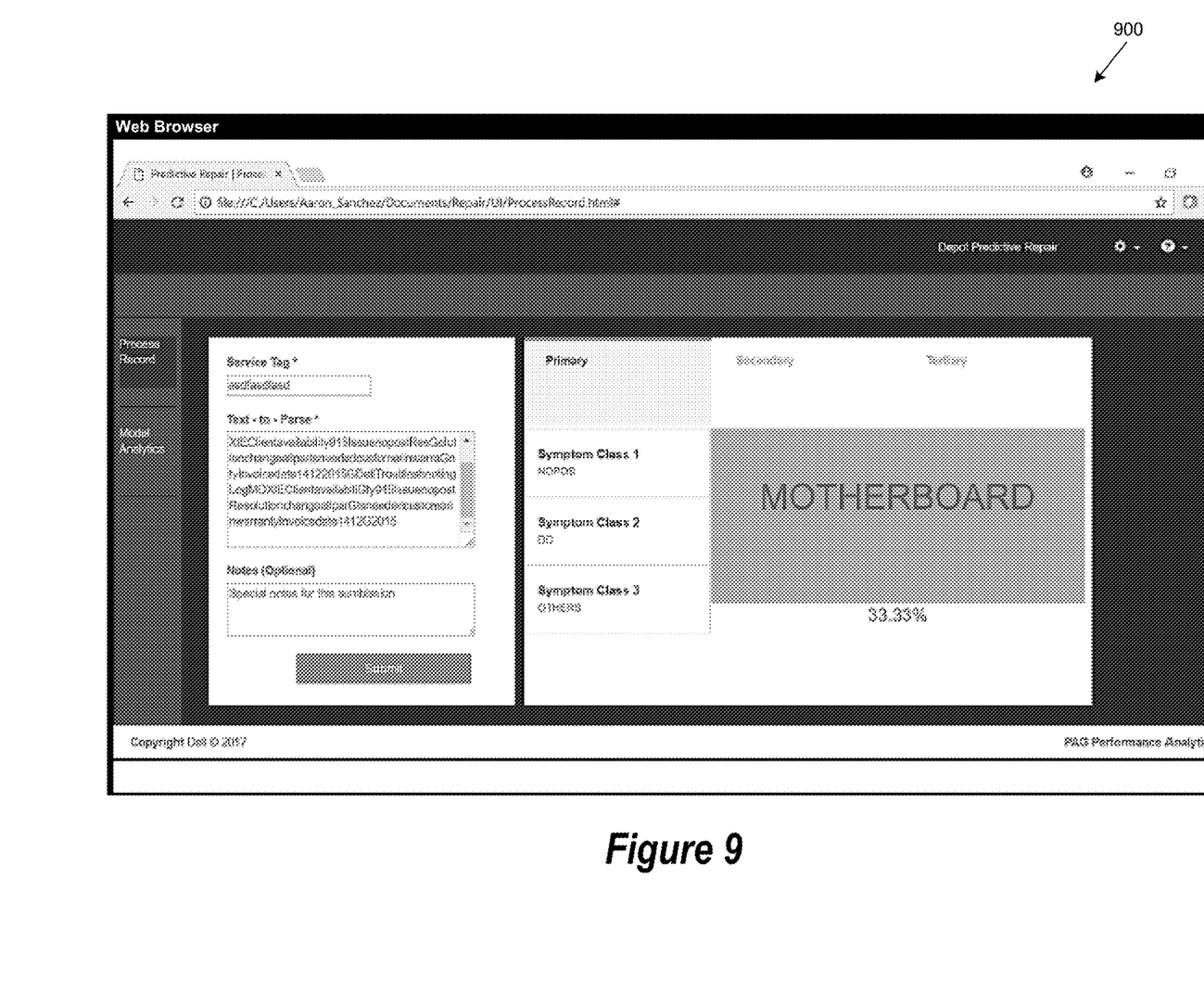
FIG. 9 shows an example screen presentation of a firmware security profiling system user interface.

FIG. 9 shows an example screen presentation of a firmware security profiling system user interface. Referring to FIG. 9, an example screen presentation of a firmware security profiling system user interface 900 is shown.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a security vulnerability detection operation, comprising:
    configuring a firmware security profiling environment with a trusted host and a trusted service processor, the trusted host comprising a host system configured to provide a trust boundary for data the trusted host provides to an associated sub-system, the trusted service processor comprising an out of band management controller, the trusted service processor being configured to provide a trust boundary for data the trusted service processor provides an information handling system;
    receiving a firmware update file via the out of band management controller of the trusted service processor, the firmware update file including an associated digital signature attesting to validity of the firmware update file, the out of band management controller of the trusted service processor providing a dedicated channel for providing the firmware update file to the information handling system;
    using the trusted service processor to identify a security vulnerability within the firmware update file; and,
    installing the firmware update file to the information handling system only when no security vulnerability is identified by the trusted service processor, the installing being performed by the trusted host.

2. The method of claim 1, wherein:
    the firmware update file is used to update a sub-system of the information handling system.

3. The method of claim 1, wherein:
    the firmware update file is received via an externally provided firmware update package.

4. The method of claim 1, wherein:
    the identifying the security vulnerabilities comprises using a malware scanning application file and the digital signature, the identifying determining whether the digital signature deceptively attests to validity of the firmware update file.

5. The method of claim 4, wherein:
    the malware scanning application file and the digital signature are provided by the trusted host.

6. The method of claim 1, further comprising:
    mapping the firmware update file to a memory-mapped device contained within the trusted service processor.

7. A system comprising:
    a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

configuring a firmware security profiling environment with a trusted host and a trusted service processor, the trusted host comprising a host system configured to provide a trust boundary for data the trusted host provides to an associated sub-system, the trusted service processor comprising an out of band management controller, the trusted service processor being configured to provide a trust boundary for data the trusted service processor provides an information handling system;

receiving a firmware update file via the out of band management controller of the trusted service processor, the firmware update file including an associated digital signature attesting to validity of the firmware update file, the out of band management controller of the trusted service processor providing a dedicated channel for providing the firmware update file to the information handling system;

using the trusted service processor to identify a security vulnerability within the firmware update file; and, installing the firmware update file to the information handling system only when no security vulnerability is identified by the trusted service processor, the installing being performed by the trusted host.

8. The system of claim 7, wherein:
the firmware update file is used to update a sub-system of the information handling system.

9. The system of claim 7, wherein:
the firmware update file is received via an externally provided firmware update package.

10. The system of claim 7, wherein the instructions executable by the processor are further configured for:
the identifying the security vulnerabilities comprises using a malware scanning application file and the digital signature, the identifying determining whether the digital signature deceptively attests to validity of the firmware update file.

11. The system of claim 10, wherein:
the malware scanning application file and the digital signature are provided by the trusted host.

12. The system of claim 7, wherein the instructions executable by the processor are further configured for:
mapping the firmware update file to a memory-mapped device contained within the trusted service processor.

13. A non-transitory, computer-readable storage medium embodying computer program code, the computer program code comprising computer executable instructions configured for:

configuring a firmware security profiling environment with a trusted host and a trusted service processor, the trusted host comprising a host system configured to provide a trust boundary for data the trusted host provides to an associated sub-system, the trusted service processor comprising an out of band management controller, the trusted service processor being configured to provide a trust boundary for data the trusted service processor provides an information handling system;

receiving a firmware update file via the out of band management controller of the trusted service processor, the firmware update file including an associated digital signature attesting to validity of the firmware update file, the out of band management controller of the trusted service processor providing a dedicated channel for providing the firmware update file to the information handling system;

using the trusted service processor to identify a security vulnerability within the firmware update file; and, installing the firmware update file to the information handling system only when no security vulnerability is identified by the trusted service processor, the installing being performed by the trusted host.

14. The non-transitory, computer-readable storage medium of claim 13, wherein:
the firmware update file is used to update a sub-system of the information handling system.

15. The non-transitory, computer-readable storage medium of claim 14, wherein:
the firmware update file is received via an externally provided firmware update package.

16. The non-transitory, computer-readable storage medium of claim 13, wherein:
the identifying the security vulnerabilities comprises using a malware scanning application file and the digital signature, the identifying determining whether the digital signature deceptively attests to validity of the firmware update file.

17. The non-transitory, computer-readable storage medium of claim 16, wherein:
the malware scanning application file and the digital signature are provided by the trusted host.

18. The non-transitory, computer-readable storage medium of claim 13, wherein the computer executable instructions are further configured for:
mapping the firmware update file to a memory-mapped device contained within the trusted service processor.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *